United States Patent [19]

White

[11] Patent Number: 4,991,900
[45] Date of Patent: Feb. 12, 1991

[54] FLOOR COVERING

[76] Inventor: A. Leon White, 23300 Providence Dr., Apt. 510, Southfield, Mich. 48075-3629

[21] Appl. No.: 419,780

[22] Filed: Oct. 10, 1989

[51] Int. Cl.$^5$ .............................................. B60N 3/06
[52] U.S. Cl. .................... 296/75; 296/97.23; 428/156; 428/167
[58] Field of Search ............... 296/75, 97.23; 180/90.6; 428/85, 156 X, 167 X

[56] References Cited

U.S. PATENT DOCUMENTS

| | | | |
|---|---|---|---|
| 2,341,080 | 2/1944 | Burkholder | 296/75 |
| 2,410,412 | 11/1946 | Hurford | 180/90.6 X |
| 2,810,671 | 10/1957 | Taylor. | |
| 3,047,088 | 7/1962 | Murrell. | |
| 3,114,272 | 12/1963 | Sawyer. | |
| 3,275,094 | 9/1966 | Kennedy | 180/90.6 |
| 3,387,315 | 6/1968 | Stata. | |
| 3,411,977 | 11/1968 | Slater, Jr.. | |
| 3,435,480 | 4/1969 | Mann, Jr.. | |
| 3,526,016 | 9/1970 | Stata. | |
| 3,577,581 | 5/1971 | Stata. | |
| 4,211,447 | 7/1980 | DiVincenzo. | |
| 4,262,048 | 4/1981 | Mitchell. | |
| 4,420,180 | 12/1983 | Dupont et al.. | |
| 4,765,670 | 8/1988 | Jackson. | |
| 4,810,024 | 3/1989 | Heller. | |

FOREIGN PATENT DOCUMENTS 1403881  8/1975  United Kingdom.

Primary Examiner—Margaret A. Focarino
Assistant Examiner—Gary C. Hoge
Attorney, Agent, or Firm—Gifford, Groh, Sprinkle, Patmore and Anderson

[57] ABSTRACT

A floor covering or floor mat is disclosed for use with an automotive vehicle having a floor and control pedals positioned at the front of the floor. The floor mat includes a plurality of steps which extend laterally across the floor of the vehicle rearwardly of the vehicle control pedals. The steps decrease in height rearwardly from the control pedals by a preset depth and each step has a preset width which extends longitudinally with respect to the vehicle. Both the preset depth and preset width of the steps are selected so that, with the operators's shoe heel positioned on one step and the sole in engagement with one control pedal, a back of the operator's shoe is spaced upwardly from the step rearwardly adjacent the step on which the operator's heel is positioned to protect the back of the shoe from scuffing.

3 Claims, 1 Drawing Sheet

FLOOR COVERING

BACKGROUND OF THE INVENTION

I. Field of the Invention

The present invention provides a floor covering which is particularly suited for use in an automotive vehicle.

II. Description of the Prior Art

Automotive vehicles, such as cars, trucks vans and the like, typically include a relatively flat floor with operator control pedals positioned at the front of the floor on the driver's side. These control pedals include the accelerator, brake and, in some cases, the clutch.

Although most vehicles include carpeted floors, it is also conventional to employ a car mat on top of the car floor behind the control pedals. These floor mats are typically flat and are constructed from a dirt and water absorbent material.

One disadvantage of these previously known floor mats for vehicles is that, when the operator's foot is positioned on one of the control pedals for the vehicle, the back of the operator's shoe as well as the operator's pant cuff contacts the floor mat. This in turn results in scuffing of the back of the operator's shoe from dirt and stones contained in the floor mat.

SUMMARY OF THE PRESENT INVENTION

The present invention provides a floor covering or floor mat particularly suited for automotive use which overcomes all of the above mentioned disadvantages of the previously known devices.

In brief, the floor mat of the present invention comprises a plurality of steps which extend laterally across the automotive vehicle floor rearwardly from the control pedals for the vehicle. These steps decrease in height rearwardly from the control pedals by a preset depth and also have a preset width extending longitudinally with respect to the vehicle.

Both the preset depth and the preset width of the steps are selected so that, with an operator's shoe heel positioned on one step of the floor mat and the sole of the shoe engaged with the control pedal, the back of the operator's shoe is spaced upwardly from the step rearwardly adjacent the step on which the operator's heel is positioned.

Although the steps can be horizontally flat, in the preferred embodiment, the steps slope rearwardly away from the control pedals. Thus, any accumulated moisture on the steps will flow or drain rearwardly down the steps and toward a lower portion of the vehicle floor.

BRIEF DESCRIPTION OF THE DRAWING

A better understanding of the present invention will be had upon reference to the following detailed description, when read in conjunction with the accompanying drawing, wherein like reference characters refer to like parts throughout the several views and in which.

DETAILED DESCRIPTION OF A PREFERRED EMBODIMENT OF THE PRESENT INVENTION

Figure 1:
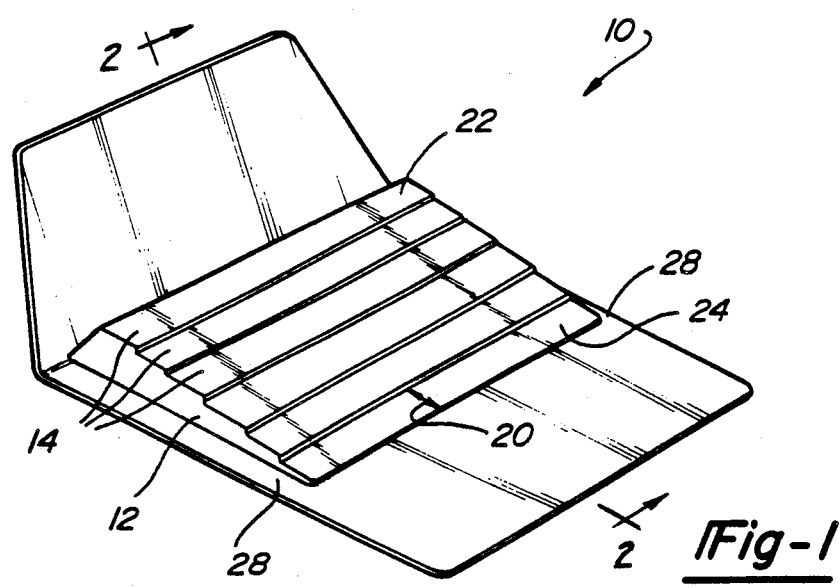
FIG. 1 is a perspective view illustrating a preferred embodiment of the present invention.
Figure 2:
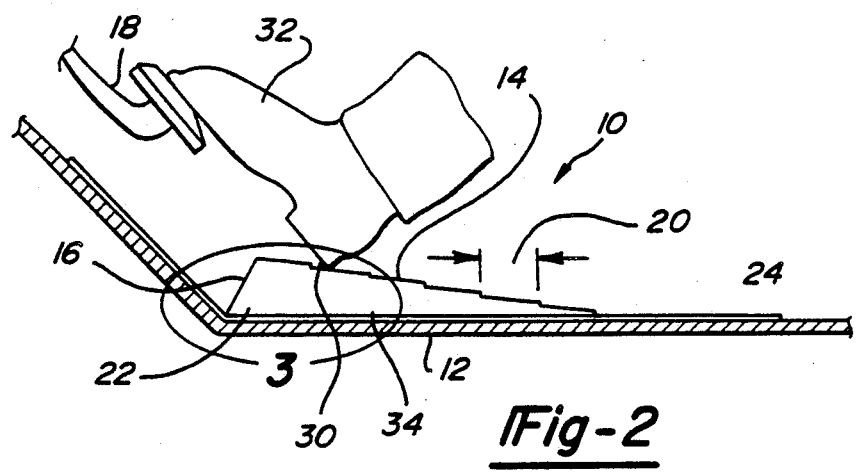
FIG. 2 is a sectional view taken substantially along line 2—2 in FIG. 1.

With reference first to FIGS. 1 and 2, a preferred embodiment of the floor covering 10 of the present invention is thereshown and comprises a floor mat 12 having a plurality of steps 14. The steps 14 are laterally elongated with respect to the axis of an automotive vehicle. In addition, the mat 12 is positioned so that a front end 16 of the floor mat 12 is positioned adjacent to and underneath a control pedal 18 (FIG. 2) of the automotive vehicle.

With reference still to FIGS. 1 and 2, each step 14 has a preset width 20 extending in a direction longitudinal with respect to the axis of the car. Similarly the steps 14 decrease in height by a preset depth from the forwardmost step 22 to the rearwardmost step 24. Consequently the steps 14 decrease in height rearwardly from the control pedals 18 of the vehicle.

Figure 3:
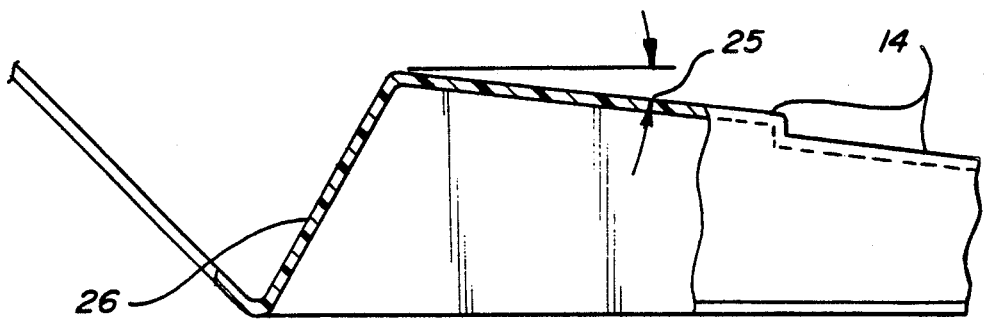
FIG. 3 is an enlarged view taken along circle 3 in FIG. 2, but illustrating a modification thereof.

As best shown in FIG. 3, preferably the steps 14 slope rearwardly at a small acute angle 25. This rearward slope 25 thus drains any moisture which collects on the top of the steps 14 rearwardly towards the bottommost step 24 of the mat 12. Additionally, the forwardmost edge 26 of the mat 12 slopes downwardly as best shown in FIG. 3. Consequently, any moisture which flows downwardly from under the control pedals 18 towards the front edge 26 of the mat 12 is drained toward the sides 28 (FIG. 1) of the mat 12 and thus away from the feet of the vehicle operator.

As best shown in FIG. 2, the preset height difference between the steps 14, as well as the width 20 of the steps 14 are dimensioned so that, with the heel 30 of an operator's shoe 32 positioned on one step 14, the back 34 of the operator's shoe is positioned upwardly from the rearwardly adjacent step 14. This thus protects the back 34 of the operator's shoe 32 from scuffing.

Although in the preferred embodiment, the mat 12 is removable from the vehicle, the mat 12 may instead form an integral part of the floor covering for the vehicle. Similarly, the floor mat 12 is preferably constructed of a synthetic plastic material.

Having described my invention, however, many modifications thereto will become apparent to those skilled in the art to which it pertains without deviation from the spirit of the invention as defined by the scope of the appended claims.

I claim:

1. A floor covering for use with an automotive vehicle having a floor and a control pedal positioned at the front of said floor, said floor covering comprising:
   a substantially flat bottom adapted to flatly abut against the floor of the vehicle adjacent to the control pedal,
   a front end, said front end positioned adjacent to and underneath the control pedal;
   a forwardmost edge at said front end, said edge sloping downward toward said vehicle floor;
   at least three steps of s preset longitudinal width, said steps laterally elongated with respect to the longitudinal axis of said automotive vehicle, said steps further extending from a forwardmost step at said front end to a rearwardmost step, said steps decreasing by a preset amount in height rearwardly from said control pedal;
   wherein a heel of a vehicle operator's shoe is adapted to be positioned on one of said steps, and wherein said preset amount is dimensioned so that, with the operator's heel positioned on one step and in engagement with the control pedal, a back of the vehicle operator's shoe is spaced upwardly from an adjacent rearward step so as to prevent scuffing of said shoe while operating said control pedals.

2. The invention as defined in claim 1, wherein each step slopes rearwardly downwardly.

3. The invention as defined in claim 1, wherein said covering is constructed of a synthetic material.

* * * * *